Oct. 20, 1925.

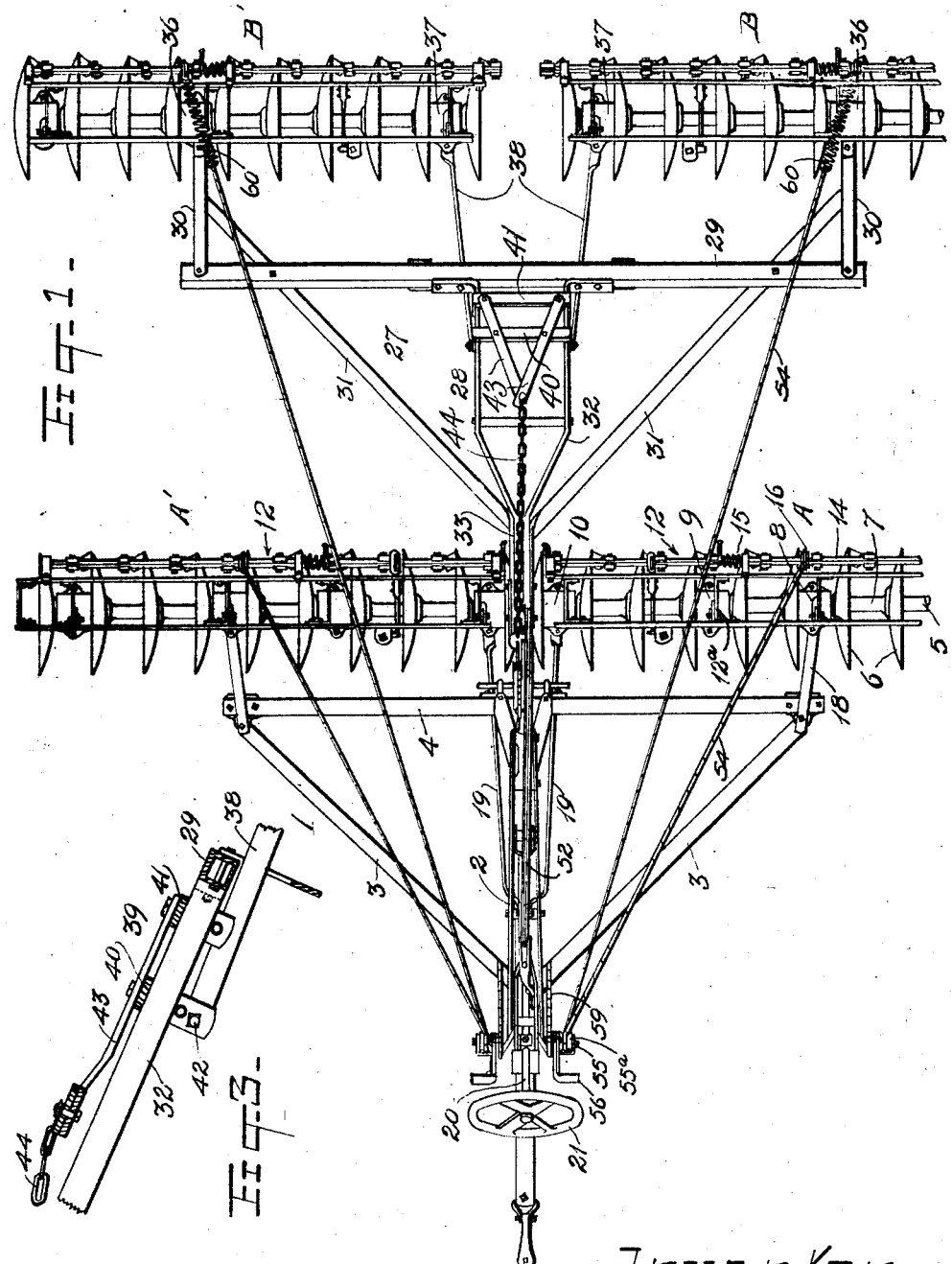

C. H. WHITE 1,558,320

DISK HARROW MECHANISM

Original Filed Aug. 4, 1919     2 Sheets-Sheet 2

Patented Oct. 20, 1925.

1,558,320

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK-HARROW MECHANISM.

Application filed August 4, 1919, Serial No. 315,088. Renewed March 21, 1925.

*To all whom it may concern:*

Be it known that I, CHARLES H. WHITE, citizen of the United States, residing at Moline, in the county of Rock Island and State of Illinois, have invented certain new and useful Improvements in Disk-Harrow Mechanisms, of which the following is a specification, reference being had therein to the accompanying drawing.

This invention relates to improvements in disk harrows, particularly those which have long gangs with numerous disks which engage powerfully with the earth; and resist movement from one angle to another; and especially in disk harrow mechanisms of the "tandem" class each having two or more pairs of such gangs, each pair mounted in a frame, and the two frames connected and drawn together.

The gangs of these harrows require frequent adjustment from one angle to another relatively to each other and to the line of draft and when long, as they are, in the engine drawn tandem harrows, demand considerable power for the adjustment.

One of the objects of the present invention is to provide for varying or adjusting the angles of the disk gangs by means of power derived from the draft devices and have it accomplished in such way that where there is but one operator for an apparatus the changing of the angle of the gangs will not divert his attention from controlling the entire apparatus.

Figure 1 is a top plan view of a disk harrow mechanism embodying my improvements.

Figure 2 is a side elevation.

Figure 3 is a view on an enlarged scale partly in section, partly in side elevation, of some of the parts for transmitting power to the rear gangs for adjusting them.

Figure 4 is a side view of the hinge element connected to the rear gang frame.

Figure 5 is a side view of the hinge element secured to the front frame.

A main frame or front frame 1 is formed of central longitudinal bars 2, inclined side bars 3, 3, and a cross bar 4; these bars being preferably of wrought metal and the frame, as an entirety, being substantially similar to some of those now in use.

Immediately behind this frame are mounted two disk gangs A, A¹. These also may be of any preferred construction suitable for the purposes of this mechanism. As shown, each gang comprises a central shaft 5, concavo-convex disks 6 and disk-spacing and bracing thimble tubes 7. Each thimble has radially expanded bosses at its ends to provide a wide engagement with the central portion of the disk. At the inner end of the gang, immediately inside of the innermost disk, there is a large boss adapted to abut against that on the opposite gang for taking the inward endwise thrust. Each gang, as shown, has three boxes at 8, 9 and 10. From these boxes there rise up standards 11 which support a super- and adjacent frame 12ᵃ. This frame supports a scraper system indicated as an entirety by 12 comprising a series of scrapers 13, one for the concave side of each disk, a scraper-carrying rod or bar 14 held, longitudinally, in normal position by a spring 15, and a lever 16.

Each gang is attached to the frame 1 by a lower pivoted link 17, and an upper link 18. These links allow endwise movement outward and inward of the gangs. These links 17, 18 are connected to the outermost boxes 8 of the gang axle systems. The inner boxes 10 are also connected to the front frame by adjustable drag bars 19.

The harrow apparatus shown is designed to be drawn across the fields by a traction engine or tractor. The operator rides on the platform at the rear end of the engine and the harrow mechanism is provided with devices by which the operator can exert considerable power in adjusting the gangs. When the latter are in alignment the disks are inactive, in respect to engaging with, and forming furrows in the soil, they, at such time, merely rolling as wheels on the surface for supporting the parts carried by them. When the disks are to be put in operation each gang must be thrown back at its inner end in order to turn forward the concave sides of the disks. The greater the angles to the line of draft of the planes of the cutting edges of the disks, the more efficiently will the later engage with the soil, and the greater will be the resistance to the forward movement.

To vary the angle of the gangs, use is made of a screw rod 20 having a hand wheel 21 accessible to the operator on the engine platform. This rod is connected with the upper end of a lever at 22 by a nut 23 engaging with the rod and swiveled in the lever 22. At 24 there is a swiveled sleeve supporting the forward end of the rod 20 and permitting its ends to swing vertically. The lever 22 is at 25 pivoted to the frame 1 or to a supplemental support 26 secured to this frame. The lower end of the lever 22 is pivotally connected to the draw bars 19 of the gangs.

When the operator desires to have the inner ends of the gangs move backward to operative positions, he rotates the screw rod in such way as to permit the links 19 to move longitudinally rearward. But little force is required to move the inner ends of the gangs backward inasmuch as the governing link connections at 17, 18 of each gang system are positioned nearer to the outer ends of the gangs than to the inner ends. As soon as the gangs begin to turn, the greater earth resistance at the inner ends causes the latter to swing backward. However, if power is required for this, it can be readily applied by the operator through the screw rod, and, on the other hand, when he desires to bring the gangs to transverse alignment, the resistance of the soil is overcome by means of the powerful transmitting devices which I have provided. No ratchets or locking dogs are required for holding the gangs at any predetermined angle, the thread and nut at 23 being self-locking at any position to which the rod may be moved.

To that part of the apparatus above described is connected the rear harrow system. It comprises the disk gangs B, B¹, each of which is approximately a duplicate of the front gangs A, A¹, except that the rear gangs are in reversed position; that is to say, are so arranged that their disks have their concave faces turned inward and their convex faces turned outward.

These rear gangs are supported and drawn by a frame 27 comprising a central longitudinally disposed part 28, cross bars 29, end bars 30 and 30ª, and the forwardly extending and converging brace bars 31. The central frame 28 is formed of longitudinal bars 32, which, at their rear ends, are inclined downward, the central parts 33 being in horizontal planes somewhat above the front disk frames, and the forward ends 34 extending downward to their point of attachment to the front frame 1. The front parts 34 of these bars and the elevated horizontal parts 33 are close together to form a rigid pivot element, while the rear parts at 32 are spread apart, as shown in Figure 1, to provide a light expanded frame element. At 35 the connecting arm 34, 33, is joined to the front frame 1 by a substantially vertical pivot connection which permits the rear harrow system to freely swing, bodily, toward the right or toward the left, independently, more or less, of the front gangs A, A¹. Such freedom of relative swing is necessary both when the apparatus as a whole is being turned at the end of a transit across the field, and also at times during a traverse in correspondence with variations in the surface of the soil. Generally, however, the four-gang elements are, when in operation, positioned similarly in respect to the central vertical longitudinal plane through the mechanism. In the gang system B, B¹, the gangs are pivotally connected to the end bars 30 and 30ª of the rear frame, the pivots joining the bars to bearing boxes 36. The inner end boxes 37 of the rear gangs are held by pivoted drag bars or links 38 which extend forward to their adjusting devices. The latter comprise a sliding frame at 39 having transverse bars 40, 41 riding slidably on the frame bars 32. The cross bar 40 is at 42 pivoted to the drag bars 38 of the rear gang. The bars 40, 41 are secured together and braced by short inclined bars 43. To the forward ends of these brace bars is connected a chain 44 which extends forward to a point in, or close to, the vertical axis of the hinge 35 of the rear frame. The chain is attached to a longitudinally swinging lever 45 joined by a pivot at 46 to the frame of the rear system, this pivot also being positioned as closely as possible in the transverse vertical plane of the main pivot at 35. While said lever is pivoted to the front portion of the rear frame, it is supported by the rear portion of the front frame through the connection of the rear frame therewith.

The parts last specified constitute a train of power devices, for angling and straightening the gangs, and with them are combined control means, including an element operable from a point outside the harrow, as for example from the tractor platform, and also including means for locking or holding the controlling means and the power devices. As shown, there is provided a thrust and pulling device in the form of a sliding rod 47, the handle 48 of which is near the engine and supported in a guide 49. The rod 47 is supported at the front by the front frame through the guide 49, and at the rear through the lever 45, so that it is held on a line approximately fixed relatively to said front frame regardless of the lateral swinging of the rear frame. The lever 45 is locked in any desired position to hold the rear gangs in their different positions of adjustment, by means of a segment 50 mounted on the rear frame and a detent carried by said lever as shown at 51, the latter being movable by a slide rod 52 adjacent to the parts at 47, 48 and connected to the detent by a lever 53.

When the angles of the rear gangs are to be varied by the operator on the platform, he grasps the handle 48 (simultaneously pulling on rod 52 and releasing detent 51) and draws the lever 45 forward. This, in turn, draws the inner end of the gang system B, B¹ forward, the force being transmitted through the chain 44 and the sliding frame 43 to the drag bars 38.

In Figure 2, the dotted lines indicate the position of lever 45, when it and its attachments are holding the rear gangs in their ordinary working positions. It will be seen that when the lever is in this position the front end of the chain 44 is, practically, at the vertical line of the main hinge pivot, 35, and that the rear harrow system can, in its entirety, swing to the right or to the left without varying the angles of the rear gangs in relation to their frame.

In some cases, these four-gang, engine-drawn, disk harrow mechanisms are constructed to have all the gangs connected to a single adjuster; so the operator can, with one movement of an actuating device, move the inner ends of the front gangs backward and simultaneously draw the inner ends of the rear gang forward. I have found that under many circumstances better results in tillage can be obtained by having the front and rear gang systems independently adjustable. The relative angles of the rear gangs should, under some circumstances, be greater or less than the angles of the front gangs in relation to the line of draft.

It will be seen that by the devices described I provide for angling the gangs of the sections independently of each other and for straightening the gangs of the front section independently of the gangs of the second section; and that for controlling the movements of the gangs and their positions I provide means operable from a point outside the harrow.

I have also provided devices for effecting the scraping of all the disks, simultaneously, in both of the right hand gangs and of all of those in the left hand gang.

The aforesaid scraper lever 16 for actuating the scrapers of a front gang is connected by a cable or similar device 54 to the scraper actuating lever 16ª of the gang immediately behind it. This cable is extended forward and supported on a bodily adjustable carrier 55. As shown, this is a pulley 55ª mounted on a lever 56 pivoted to the standard or upright frame 57 rising from the front end of the main frame 1. The lever has a detent 58 engaging with a lock segment 59.

When the operator desires to effect the scraping of all the disks, of, for example, the right hand gangs, he releases detent 58, and, by lever 56, moves the pulley or support 55ª and through the cable 54 and the levers 16, 16ª moves the scrapers 13, 13ª, simultaneously, to their operative positions in relation to their respective disks. The levers 16, 16ª are positioned, as closely as possible, to the vertical axes around which the gang systems swing horizontally and consequently the ends of the cable have a minimum of displacement from the points where the drafts on the two strands of the cable are maintained at a balance. The inner ends of the gang systems can, when the front and rear systems are in parallel, be independently angulated without materially varying the lengths of the cable strands extending from the pulley 55 to the scraper levers. And the rear frame and its gangs can swing within the ordinary range independently of the front gangs without materially modifying the relationships of the cable strands. To compensate for such slight variation as may occur, I insert into the line of the cable a coil spring 60 of proper tension to yield, when occasion demands, and also to take up such slack as exists.

There are two of the scraper adjusting cable systems, one for the right hand gangs and one for those at the left; and they are substantially duplicates of each other. At many times the disks on one side of the central plane will be contacting with dry nonsticky soil that does not adhere to the surfaces or impede their operations, while, at the same time, the disks on the other half of the mechanism will be in muddy or sticky earth, or will be contacting with the stems or stalks of grasses and weeds of the wiry class which refuse to be cut by the disks, but form mats around the peripheries. At such times the operator is not called upon to perform the severe work of throwing all of the scrapers to active positions as, with the devices described, he can cause the cleaning of the convex surfaces or of the cutting edges of one set independently of the others.

What I claim is:

1. The combination of a front frame, the disk gangs connected thereto, the rear laterally swinging frame flexibly connected to the front frame, the rear gangs connected to the rear frame and adjustably movable relatively thereto, the adjusting device for the rear gangs having a rear element supported on and movable longitudinally of the rear frame, and a front element supported on the front frame and held on lines approximately fixed relatively to said frame, and adapted to exert draft on the rear element and on the rear gangs, and a vertically swinging lever supported on a pivot approximately in the vertical lines around which the rear frame swings and adapted to actuate the rear gang adjusting device.

2. The combination of a front frame, the disk gangs connected thereto, the front gang adjusting device on the frame, the rear laterally swinging frame flexibly connected to the front frame, the rear gangs connected to the rear frame and adjustably movable relatively thereto, the adjusting device on the rear frame for the rear gangs and a lever mounted at the axis of lateral swing of the rear frame for actuating the rear gang adjusting device, and means on the front frame for actuating the lever independently of the front gang adjusting device.

3. The combination of a front frame, the disk gangs connected thereto, the rear laterally swinging frame flexibly connected to the front frame, the rear gangs connected to the rear frame and adjustably movable relatively thereto, the adjusting device for the rear gangs supported on and movable longitudinally of the rear frame, and a vertically arranged lever supported on the front end of the laterally swinging frame for actuating said adjusting device, and means extending from the lever forward to the front end of the front frame for actuating the lever.

4. The combination of a front frame, the disk gangs connected thereto, the rear laterally swinging frame flexibly connected to the front frame, the rear gangs connected to the rear frame and adjustably movable relatively thereto, the adjusting device for the rear gangs supported on and movable longitudinally of the rear frame, a lever pivotally supported in approximately the vertical lines around which the rear frame swings, and a flexible connection between the lever and the rear gang adjusting device, and means extending forward from the lever for actuating it.

5. In a double disk harrow of the class described, the combination of the front frame, the laterally swinging rear frame pivoted to the front frame, disk gangs connected to the front frame, disk gangs connected to the rear frame, the front gangs and the rear gangs being adapted to be angled independently of each other, separately operable control means supported by said front frame and having initial power-receiving elements arranged to be actuated by power applied from points in front, and outside, of the horrow, and power transmitting devices positively actuated by said control means respectively for angling the front gangs while the rear gangs remain at fixed angles, and for angling the rear gangs while the front gangs remain at fixed angles.

6. A double disk harrow comprising a front frame, a rear frame pivotally connected at the front with the rear portion of said front frame to be drawn thereby and to swing laterally relatively thereto, front and rear sets of angularly adjustable disk gangs connected respectively with said front and rear frames, control devices separately operable from in front of said front frame, connections actuated by and leading from one of said control devices to the front set of gangs for angularly adjusting the gangs of said set, and connections actuated by and leading from the other of said control devices to the rear set of gangs for angularly adjusting the gangs of the latter set, the latter connections having a support in approximate axial alinement with the pivot of the rear frame.

7. A double disk harrow comprising front and rear sets of disk gangs, frames on which said sets of gangs are respectively mounted, said frames being pivotally connected together to dispose said sets of gangs in tandem relation to each other and permit lateral swinging of the rear set of gangs relatively to the front set of gangs, control devices mounted on one of said frames in advance of the axis about which the rear set of gangs swings and separately operable from in front of the harrow, connections actuated by and leading from one of said control devices to the front set of gangs for angularly adjusting the gangs of said set, and connections actuated by and leading from the other of said control devices to the rear set of gangs for angularly adjusting the gangs of the latter set.

8. The combination of a front frame, the disks connected thereto, the rear laterally swinging frame pivotally connected to the front frame to swing around a vertical axial line, the rear gangs adjustably connected to the rear frame, the adjusting devices for the rear gangs comprising two elements, to-wit, a rear element supported on and movable longitudinally of the rear frame and extending to the said vertical axial line, and a front element for actuating said rear element supported on the front frame and extending forward from said vertical axial line.

9. The combination of a front frame, disk gangs connected thereto, a front gang adjusting device on said front frame, a rear frame flexibly connected with said front frame to swing laterally, rear gangs connected with said rear frame and adjustably movable relatively thereto, adjusting means on the rear frame for the rear gangs, separately operable controlling means for the rear gangs supported by the front frame, and an operating connection for actuating the rear gang adjusting means from said controlling means lying substantially in vertical alinement with the axis of lateral swing of the rear frame.

10. The combination of a front frame, disk gangs connected thereto, a rear frame arranged to swing laterally relatively to said front frame, rear gangs connected with said rear frame and adjustably movable relatively thereto, draft devices common to said frames, separately operable means for angularly adjusting the front and rear gangs respectively, and separately operable controlling devices supported by one of said frames, one of said controlling devices having an operating connection with the adjusting means for the gangs connected with the other frame, said connection being substantially in vertical alinement with the axis about which said rear frame swings laterally.

11. In a double disk harrow the combination with front and rear frames angularly movable relatively to each other, disk gangs connected to said front frame, means carried by said front frame for simultaneously adjusting said front disk gangs relatively to the line of draft, disk gangs connected to said rear frame, means carried by said rear frame for simultaneously adjusting said rear disk gangs relatively to the line of draft, and a plurality of controlling devices supported by said front frame and operable independently of each other, one of said controlling devices being connected with the adjusting means of said front gangs and the other of said controlling devices being connected with the adjusting means of said rear gangs.

12. A disk harrow comprising in combination a front frame, disk gangs adjustably connected with said frame, a rear frame, disk gangs adjustably connected with said rear frame, means connecting said frames for lateral swinging relatively to each other, means mounted on the rear frame for adjusting the cutting angle of the rear gangs and holding said gangs in their different positions of adjustment, and means supported by the front frame for actuating the adjusting means of the rear gangs.

In testimony whereof, I affix my signature.

CHARLES H. WHITE.